Jan. 25, 1955  F. L. SIMMONS  2,700,744
PERMANENT MAGNET CHUCK
Filed May 24, 1951

Inventor
Frank L. Simmons
By Clayton L. Jenks
Attorney

United States Patent Office 2,700,744
Patented Jan. 25, 1955

2,700,744

PERMANENT MAGNET CHUCK

Frank L. Simmons, Woonsocket, R. I.

Application May 24, 1951, Serial No. 227,965

4 Claims. (Cl. 317—159)

This invention relates to a permanent magnet chuck, and particularly to a chuck of the type shown in my prior patent #2,390,743 of December 11, 1945.

In the chuck shown in Figs. 1 to 5 of said patent, a permanent magnet has spaced ribs at its top which provide north polar faces. The south pole bottom of the magnet is flat and contacts with a steel plate forming the bottom of the chuck. The work plate has a steel frame provided with openings separated by cross ribs forming south pole faces. Steel inserts in the openings and insulated from the cross ribs form the north pole pieces of the plate by contacting with the tops of the spaced ribs of the magnet. The return flux path from the south pole rim of the work plate to the bottom of the chuck is provided by a rectangular hollow frame formed of steel sides and end plates which contact with both the work plate rim and the bottom plate. The permanent magnet is moved lengthwise of the casing by a crank mechanism which causes the north polar faces of the magnet to contact with the under sides of both of the north and south pole pieces of the work plate and thus serves to shunt the flux out of the work by providing a shorter path therefor. This operating mechanism is, however, located at the end of the casing and occupies valuable space, so that a very considerable portion of the work plate at that end is not properly magnetized because of its distance from the magnet and work cannot be securely held thereon. Also, the magnet is necessarily narrower than the cross width of the north pole inserts of the work plate, which are arranged to project over the side steel plates that form the return path for the flux. I have found that the north pole steel inserts of the work plate carry residual magnetism at their ends when the chuck magnet is in the "off" position. This is due to the fact that the polar faces of the magnet ribs contact only with the medial portion and not the ends of these pole piece inserts, and the residual magnetism carried by the steel is sufficient to hold the work somewhat and prevent easy removal thereof without scratching. The plates of the steel frame surrounding the magnet and constituting the flux return path were arranged to contact with both the work plate rim and the steel bottom plate of the magnet, and these hindered rather than helped in shunting the flux for the "off" position.

The primary object of this invention is to overcome these problems and to provide a permanent magnet chuck which will hold work securely in place throughout substantially the entire top of the work plate and yet will release the work for free removal thereof when the flux is shunted out of the pole pieces of the work plate.

A further object is to provide a magnet construction which will give a substantially uniform distribution of flux to the north pole inserts of the work plate and yet will prevent the work plate pole piece inserts from retaining residual magnetism when the chuck is in the "off" position and thus make it easy to remove the work.

Another object is to provide an operating mechanism for moving the magnet assembly relative to the work plate which can be operated easily and effectively and will position the magnet polar faces correctly relative to the work plate for both the "off" and "on" positions. Other objects will be made apparent in the following disclosure.

Referring to the drawings which illustrate one embodiment of my invention:

Figure 1:
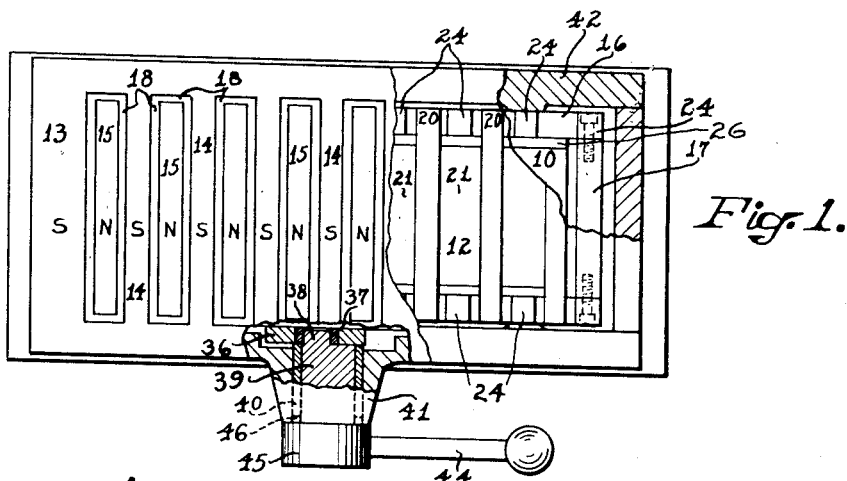
Fig. 1 is a top plan view of a permanent magnet chuck which is partly broken away to show details and particularly the magnet operating mechanism.

The preferred embodiment of my invention, as illustrated in the drawings, comprises a permanent magnet of suitable material, such as Alnico which is an alloy of iron, aluminum, nickel and cobalt. This magnet 10 is shaped as a parallelepipedon having parallel plane top and bottom faces. The bottom face contacts magnetically with a steel plate 11 forming the bottom of the chuck. The top flat face contacts magnetically with a flux distributing plate 12 which thereby forms a vertical continuation of the magnet so that its top face constitutes the upper magnet pole, herein termed "north." The work plate 13 is a soft steel plate formed as a grid having south pole cross ribs 14 separated by rectangular cut-out portions which provide space for the north pole inserts 15, as is described in said patent. The return path for the flux is formed by a steel frame composed of two side members 16 and two end members 17 which are held together by bolts or screws and are secured to the magnet so that the magnet and the steel plate frame may be moved as a unit relative to the work plate thereabove. The side steel plates 16 have flat bottom faces parallel with and magnetically contacting with the south pole base plate 11. At their upper ends, the side plates 16 contact with the south pole cross ribs 14 and these form a return path for the flux which has traveled from the north pole pieces 15 through the work and thence into the cross ribs 14 and down through the side plates 16 and into the bottom plate 11 which contacts with the under south pole face of the magnet.

Figures 2, 3:
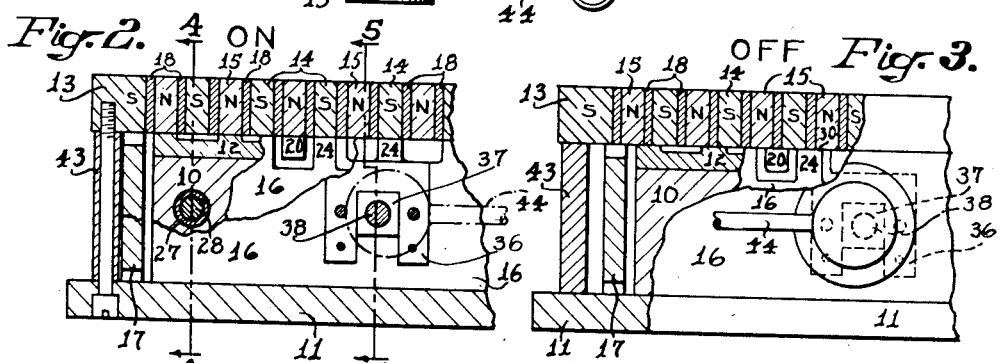
Fig. 2 is a longitudinal fragmentary vertical sectional view of the chuck with some parts in full lines and others broken away to show details of the construction, the magnet polar faces being located in the "on" position.
Fig. 3 is a similar vertical sectional view with the magnets in the "off" position.

As shown in Figs. 2 and 3, the north and south pole pieces 14 and 15 of the work plate have their bottom faces lying in a single plane, or they have the same vertical thickness. The inserts 15 of the work plate, as well as the other steel parts, are made of a low carbon soft steel or other suitable magnetic material of high permeability. The inserts 15 and the cross ribs 14 have preferably the same width longitudinally of the chuck so as to provide an even flux distribution. The inserts 15 are spaced from the walls of the rectangular openings in the work plate by means of a suitable non-magnetic material 18. For example, they may be secured within the plate openings by means of spot brazing, after which the remainder of the space is filled with Babbitt metal. The brazing metal is preferably bronze or brass. The upper and lower faces of the Babbitt metal 18 lie in the planes of the upper and lower faces of the work plate so as to provide smooth contact surfaces.

Figures 4, 5:
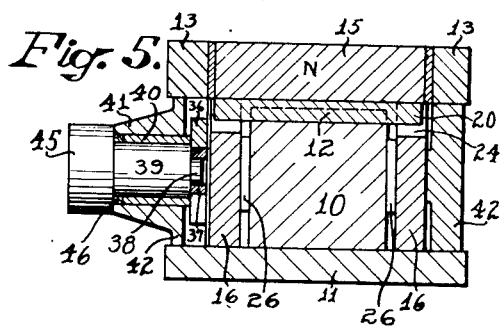
Fig. 4 is a transverse vertical section taken substantially on the line 4—4 of Fig. 2.
Fig. 5 is a transverse vertical sectional view taken on the line 5—5 of Fig. 2.
Figures 6, 7:
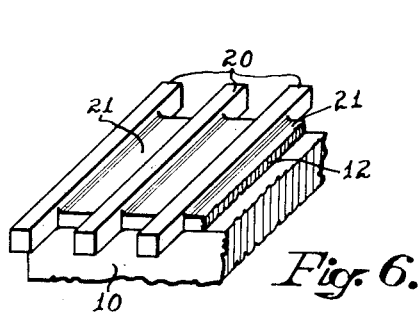
Fig. 6 is a fragmentary perspective view of a steel flux distributing plate which magnetically contacts with the top surface of the magnet.
Fig. 7 is a fragmentary perspective view of two pole pieces and one of the soft steel side plates 16 which forms a return path for the flux.

One feature of this invention lies in the construction and arrangement of the flux distributing plate 12, which connects the inserts 15 only to the top north pole of the permanent magnet 10. The plate 12 is made of highly permeable soft steel having a flat under face lying in a plane and in magnetic contact with the top of the magnet 10, to which it may be secured by welding. At its top, the plate is provided, as shown in Fig. 6, with spaced cross ribs 20 formed by cutting away the intermediate portions to form lower flat surfaces 21 or grooves between the adjacent ribs 20. The corners of the grooves may be rounded. It will be noted that the part 21 is shorter transversely of the chuck than are the ribs 20. The lower part 21 has the same width as the magnet and makes a full contact with the upper surface thereof. The ends of the ribs 20 project laterally to such a distance that they contact with the entire under face of each north pole insert 15, as shown in Fig. 5. Thus the flux from the magnet 10 coming up through the bottom portion 21 and distributed into the ribs 20 of the plate 12 is able to pass vertically into the end portions of the north pole inserts 15 and provide a substantially uniform flux in those inserts. The air space formed by the groove between the ribs 20, as shown in Figs. 2 and 3, subtends the entire distance covered by the width of the south pole rib 14 and the two Babbitt metal inserts 18 at each side thereof, while the rib 20 has the exact width of the pole piece 15. This provides an air gap of sufficient size, such that flux will not leak materially from the distributing plate 12 to the south pole pieces thereabove but will pass wholly into the north pole pieces 15 throughout the entire length.

When the magnet assembly including this flux plate 12 is moved towards the right (Fig. 2) to the "off" position of Fig. 3, the rib 20 of the flux plate will straddle the Babbitt insert 18 and contact both the north pole insert 15 and the south pole cross rib 14 and thus shunt out the flux, as is described in my prior patent. This shunting necessarily takes place throughout the entire length of each north pole insert 15 because the parts 15 and 20 have the same horizontal dimensions, and therefore there is no residual magnetism left at the ends of that insert, as has been found in the prior construction.

The two side plates 16 of the steel frame are provided also with top contact lugs or short ribs 24. As shown in Fig. 7, these contact ribs 24 are spaced and shaped to contact with the grid frame and the ends of the south pole cross ribs 14 of the work plate grid in the positions shown in the right half of Fig. 1 and in section in Fig. 4. These ribs 24 project upwardly into the spaces between the ends of the ribs 20 of Fig. 6, but of course do not touch them. The tops of the ribs 24 lie in the plane of the tops of the ribs 20 and therefore both of these sets of ribs contact properly with the under faces of the north and south pole pieces of the work plate which lie in the same plane. These two side steel plates 16 are secured to the end plates 17 to make a rectangular frame surrounding but magnetically spaced from the magnet. This spacing is provided by brass plates 26 (Fig. 4). The end plates 17 are made short vertically (Fig. 2) so that they do not touch either the south pole rim 13 of the work plate or the bottom steel plate 11 of the chuck casing and therefore do not interfere in any way with the transmission of the flux.

The entire assembly of the permanent magnet 10 and the steel frame made of the plates 16 and 17 is bolted together, as shown particularly in Fig. 4. To this end, the magnet is originally cast with a large hole therethrough which is filled with brass or other suitable metal 27, and this is drilled out to provide room for the brass bolts 28. These bolts have their heads countersunk into one of the steel plates 16 and they are threaded at their opposite ends into the other plate 16, thus serving to clamp the steel plates 16 and the brass inserts 26 in an immovable position relative to the magnet, so that all of the parts may be slid along as a unit on the bottom casing plate 11. The end plates 17 are held to the side plates 16 by cap screws.

In this construction, the flux distributing plate 12 makes a full contact with the north pole inserts 15, while the top contact lugs 24 of the side steel plates 16 contact with the cross ribs 14 only near their ends, but the permeability of the steel is so great that this lesser contact area does not interfere with the flux distribution and the south pole cross ribs are provided with adequate flux concentration. Since the magnet 10, the flux plate 12 and the side plates 16 are bolted together and move as a unit, the top contact faces 24 of the side plates 16 will move towards the right and will contact with the left hand edge 30 (Figs. 3 and 7) of each pole piece 15 and thus serve to connect each south pole rib 14 of the work plate grid with the left hand edge of each north pole insert 15, while at the same time the polar ribs 20 of the flux plate 12 will move over to connect the opposite or right hand side of the same north pole insert 15 (Fig. 3) with the south pole rib 14 that is to the right of it. Thus each side of the north pole insert 15 is neutralized.

The magnet and the south pole plate assembly is moved lengthwise of the casing by the cam and follower mechanism shown in Figs. 1, 2 and 5. This comprises an inverted U-shaped steel cam plate 36 (Fig. 2) secured as by screws on the side of one of the side plates 16 and centrally of its length. The downwardly opening slot in this member 36 is rectangular and it carries an oil-impregnated bronze slide 37 which fits between the inner parallel walls of the U member. This slide has a cylindrical bearing hole located centrally thereof which interfits with a cylindrical crank pin 38 formed integrally with and eccentric of the axis of a rotatable crank shaft 39 which is mounted within an oil-filled bronze bushing 40 carried by a boss 41 on the side of the aluminum wall 42 forming a part of the side walls of the casing. The side wall 42 is cut away on its inside to accommodate the parts. The short crankshaft 39 is rotated within its bearing 40 by a handle 44 suitably secured to the outer end 45 of the shaft. A felt washer 46 may be interposed between the outer cylindrical enlarged end 45 of the shaft and the bushing 40 to prevent oil leakage and make a tight casing at this point. As shown in Figs. 1 and 3, the pin 38 is eccentric relative to the axis of the shaft 39 so that when the handle 44 is rotated through a half turn from the right hand position of Fig. 2 to that of Fig. 3, the pin 38 will move its associated cam follower 37 and the magnet assembly towards the right, or in the opposite direction when the handle is reversed. The follower is rectangular and fits against the flat end wall of the U-shaped cam slot and the dimensions are such that when the handle is rotated through 180°, the block 37 will move downwardly and then again up into contact with the slot end. Hence the upper end of the slot constitutes an end stop for the "on" and "off" positions of the handle.

The chuck casing, including the side walls 42 and the end walls 43 may be made as an aluminum casting or frame. As shown, the vertical aluminum walls form with the steel bottom 11 and the work plate 13 an enclosure for the working parts of the chuck. If desired, magnetic material may be used for the casing walls. The face plate and bottom are held in place by cap screws passing through the aluminum casting. Also, the side walls are provided with inwardly projecting bosses which guide the magnet assembly in its movement but space it from the casing.

Since the operating mechanism is located centrally of the magnet, it can move the magnet assembly much more easily in its push and pull movement. Even more important is the fact that this mechanism is located medially of the side of the chuck casing and not at the end, so that the two ends of the casing need to be provided with only enough space to permit the slight movement of the magnet. This means that the two south pole ends of the work plate 13, which are located outside of the last north pole insert, are comparatively narrow and need not be much wider than that pole insert. Consequently, the magnetic flux between each insert 15 and the adjacent end of the grid frame 13 is sufficiently concentrated to hold a work piece when located close to the end of the plate.

It will now be appreciated that various modifications in this construction may be made, such as are shown in said patent. Also, a plurality of magnets may be arranged end to end for a long chuck or side by side with suitable spacing plates of brass or other non-magnetic material, and the flux distributing plate 12 will be suitably modified. Although the work plate pole piece inserts 15 have been shown as having the same width as that of the south pole cross ribs of the work plate grid, the inserts 15 may be made somewhat wider than the grid bar or rib 14 so as to provide a more extensive contact or overlapping and thus provide an effective neutralization of the flux. Various other modifications may be made in the construction within the scope of the appended claims.

The operation of this device has been made apparent in the above disclosure. When the chuck is to be used, the handle of the cam and follower mechanism is thrown to the position of Fig. 2 wherein the top polar faces 20 of the flux distributing steel plate 12 contact fully with the under faces of the north pole inserts 15 of the work plate. At the same time, the top south polar faces 24 of the side steel plates 16 contact only with the cross ribs 14 of the work plate grid near their ends, as shown in Figs. 1 and 2. Thus the magnetic flux passing from the magnet through the flux plate 12 and into the north pole inserts 15 passes thence through the work and into the south pole cross ribs 14 and downwardly through the contact lugs 24 of the side plate 16 to the steel bottom 11 of the casing which contacts magnetically with the lower south pole of the magnet 10. When the work is to be removed, the handle 44 is thrown to the left and this moves the magnet 10 and the associated steel plates 16 and 17 to the positions of Fig. 3. As indicated in Fig. 7, the lugs 24 of the plate 16 in the "off" position remain partly in contact with the cross ribs 14 of the work plate grid and also touch the left hand edge portions of each north pole insert 15. At the same time, the ribs 20 of the flux plate 12 have moved toward the right (Fig. 3) so that they now overlap the Babbitt between each north pole 18 and the adjacent south pole rib 14 at its right. This contact with both of the pole pieces provides a shunt path for the flux which keeps it out of the work.

By having the flux plate 12 on the top of the magnet, it is now feasible to make the magnet by a simple machining operation and not be obliged to form the upstanding contact ribs thereon. The steel has a much higher permeability than has the Alnico magnet alloy and so serves better to distribute the flux to the work plate than could the magnet, and this distribution is quite uniform. This steel flux distributing plate of this construction increases the holding power of the chuck by at least 25% over that of a chuck having the magnet contacting directly with the work plate pole pieces. The chuck casing side and end walls are preferably made of aluminum or, if desired of other non-magnetic material, but steel or other magnetic metal may be used.

I claim:

1. A magnetic chuck comprising a hollow casing having a flat bottom plate of magnetic metal and vertical sidewalls, a work plate secured on the casing walls which has two sets of alternately arranged, magnetically isolated, transverse, work holding pole pieces provided with lower contact faces, a permanent magnet having upper and lower horizontal pole faces, the lower pole face being slidably mounted over and contacting magnetically with said bottom plate, a horizontal flux distributing, non-energizing metal plate of higher permeability than the magnet having a flat bottom magnetically contacting with the entire upper pole face of the magnet and secured to be moved therewith, said flux distributing plate having spaced transverse polar ribs forming the upper terminal polar face of the magnet which operatively contact with the under faces of one set of alternate pole pieces throughout substantially their entire lengths, a magnetic metal return circuit comprising at least one flux member mounted at the side of and secured to the magnet for movement therewith, a spacer for magnetically isolating the flux member from the magnet, said member magnetically contacting at its bottom with the casing bottom, and having spaced polar ribs at its top operatively engaging the under faces of the other set of pole pieces, said polar ribs of the flux distributing plate extending at their ends laterally beyond the planes of the sides of the magnet and between but isolated from the polar ribs of the flux member so as to engage the ends of the associated pole pieces, and means for slidably moving the assembly of magnet and flux member as a unit within the casing and transversely of the pole pieces, said parts being so constructed and arranged that each polar rib may contact with only one pole piece in an operative position or alternatively with two adjacent pole pieces in a position of short circuiting the flux from the work on the work plate.

2. A chuck according to claim 1 in which the assembly moving means comprises a cam mounted on a vertical side of the flux member of the assembly, a follower engaging the cam which is movably mounted on the side wall of the casing and a crank and eccentric on said casing wall arranged to operate the follower and thereby move the assembly within the casing, and a stop cooperating with said follower which limits the end movement of the assembly to exact work holding and flux shunting positions.

3. A magnetic chuck comprising a hollow casing having a bottom of magnetic metal and side and end walls, a permanent magnet having parallel top and bottom pole faces which is slidably mounted in the casing and magnetically connected with the casing bottom, two vertical non-energizing magnetic metal side plates secured at the opposite sides of the magnet and movable therewith which engage the casing bottom and form a return flux path, spacers for isolating the metal plates from the magnet, a work plate on the casing walls having two sets of alternately arranged, magnetically isolated parallel pole pieces provided with lower flat contact faces in a plane which extend transversely beyond the planes of the sides of the magnet and over said plates, a separate flux distributing, non-energizing magnetic metal plate of high permeability fixedly secured on and having a flat face of the same size as and magnetically contacting with the entire top face of the magnet, said flux distributing plate having spaced ribs forming the terminal polar faces of the magnet which project at their opposite ends laterally of and beyond the side faces of the magnet and over the side plates and forms with the magnet a T-shaped structure which contacts at the tops of its ribs with substantially the entire under faces of only one set of pole pieces in a work holding position or alternatively with both sets in a flux shunting, non-holding position, said side plates having spaced lugs extending vertically between but isolated from the projecting ends of the flux plate ribs and forming with the casing bottom a U-shaped structure for the return flux path, said spaced lugs of the side plates contacting only with the other set of pole pieces near their ends when in a work holding position or alternatively with both sets of pole pieces, and means for moving the magnet and side plates as a unit assembly into either of said two positions.

4. A magnetic chuck comprising a hollow casing having a bottom of magnetic metal and side and end walls, a work plate on the casing walls having two sets of alternately arranged, magnetically isolated pole pieces provided with lower contact faces, a permanent magnet mounted in the casing for sliding in a direction parallel with a side wall and having a flat lower polar face magnetically connected with the bottom, ribs forming the upper pole face of the magnet which slidably contact in a workholding position with the lower faces of one set of work plate pole pieces of one polarity, a vertical flux carrying member at the side of the magnet having spaced ribs slidably contacting magnetically with the lower faces of the other set of pole pieces of the opposite polarity when in a workholding position, said flux member contacting magnetically with the casing bottom and forming with a work piece a return circuit for the magnetic flux, means for magnetically isolating but connecting said magnet and member so that they are movable together lengthwith of the casing as a magnet assembly from said workholding position to one in which adjacent pole pieces of the work plate are thereby magnetically connected in a shunt circuit, mechanism for moving the magnet assembly comprising a cam mounted on the side and medially of the length of the assembly, an operating follower engaging said cam which is movably mounted on a side wall of the casing, means for moving the follower relative to the cam and thereby shifting the position of the magnet assembly lengthwise of the casing, and a stop for limiting the end movements of the assembly alternatively to exact workholding and flux shunting positions.

References Cited in the file of this patent

UNITED STATES PATENTS

| | | |
|---|---|---|
| 1,003,900 | Hanson | Sept. 19, 1911 |
| 1,081,462 | Patton | Dec. 16, 1913 |
| 1,451,268 | Morgan | Apr. 10, 1923 |
| 2,359,293 | Beechlyn | Oct. 3, 1944 |
| 2,360,928 | Beechlyn | Oct. 24, 1944 |
| 2,390,743 | Simmons | Dec. 11, 1945 |

FOREIGN PATENTS

| | | |
|---|---|---|
| 593,939 | Great Britain | Oct. 29, 1947 |